(12) United States Patent
Makino

(10) Patent No.: US 6,525,716 B1
(45) Date of Patent: Feb. 25, 2003

(54) HANDWRITTEN DATA INPUT DEVICE HAVING COORDINATE DETECTION TABLET

(75) Inventor: Ieharu Makino, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/049,231

(22) Filed: Mar. 27, 1998

(30) Foreign Application Priority Data

Apr. 1, 1997 (JP) .............................................. 9-096355
Apr. 28, 1997 (JP) ............................................ 9-122792

(51) Int. Cl.$^7$ ................................................. G09G 5/00
(52) U.S. Cl. .................... 345/173; 345/179; 178/18.01; 178/18.03; 382/187; 382/188
(58) Field of Search .................... 345/173, 179; 178/18.01, 18.03, 18.05, 18.06, 18.09, 19.03; 382/119, 181–182, 187–188; 359/113; 434/349, 327, 359, 353

(56) References Cited

U.S. PATENT DOCUMENTS

| 3,146,532 A | * | 9/1964 | Shwisha et al. | 434/349 |
| 3,218,733 A | * | 11/1965 | Roop et al. | 434/349 |
| 3,242,596 A | * | 3/1966 | Smith | 434/349 |
| 4,167,069 A | * | 9/1979 | Acker | 434/349 |
| 5,513,278 A | * | 4/1996 | Hashizume et al. | 382/187 |
| 5,634,134 A | * | 5/1997 | Kumai et al. | 359/798 |
| 5,698,822 A | * | 12/1997 | Haneda et al. | 178/18 |
| 5,838,302 A | * | 11/1998 | Kuriyama et al. | 345/173 |
| 6,006,012 A | * | 12/1999 | Shimizu | 359/113 |
| 6,008,799 A | * | 12/1999 | Van Kleeck | 345/173 |
| 6,266,061 B1 | * | 7/2001 | Doi et al. | 345/358 |

FOREIGN PATENT DOCUMENTS

| JP | 08-286809 A | 11/1996 |
| JP | 09-091083 A | 4/1997 |
| JP | 09-091377 A | 4/1997 |

OTHER PUBLICATIONS

English language Abstract only.

* cited by examiner

Primary Examiner—Richard Hjerpe
Assistant Examiner—Kimnhung Nguyen
(74) Attorney, Agent, or Firm—Frishauf, Holtz, Goodman & Chick, P.C.

(57) ABSTRACT

A handwritten data input device comprises a coordinate detection tablet for detecting handwritten data input by handwriting with an input pen, and a program recording medium therefore, and is characterized in that, merely as a particular symbol such as a check mark is input by handwriting to an input region of the tablet, the handwritten data can be converted into a category code corresponding to the particular symbol, for each and every input region on the tablet. The category codes which indicates the meanings of the respective marks are stored in the RAM while the particular marks are associated with the respective handwriting marking boxes on a marking sheet. When a mark is handwritten in a marking sheet on the tablet, the CPU searches the contents of the RAM on the basis of the written mark, and converts it into a corresponding category code.

12 Claims, 26 Drawing Sheets

FIG.2A

EXAMPLE OF CHECK MARK :
- ✓ NO ABNORMALITIES FOUND
- ○ ALREADY ADJUSTED OR CLEANED
- / NON OF ABOVE
- × NEED REPAIRS

CHECK BOX

FIG.2B

○△× INSPECTION DOCUMENT

1. EXAMINATION OF APPEARANCE
   - STATE OF HEAT/COLD INSULATION #1 ✓
   - ANY DAMAGE ON APPEARANCE OF MAIN-BODY #2 ○
   - OPERATION BOARD (INNER AND OUTER SURFACE) #3 /
   - WIRES AND CONNECTIONS #4 ×

2. INSPECTION
   - SMOKE CHANBER #5
   - CLEANING OF NOZZLE #6
   - COOLANT WATER #7
   - WASHING NECCESSARY #8

3. INSPECTION OF PARTS PERIODICALLY REPLACED
   - MOUNT TILE #9
   - BAFFLE #10
   - RAPTURE DISK #11
   - AIR PACKING #12
   - LUBRICANT OIL #13

4. CONFIRMATION AFTER COMPLETION OF OPERATION
   - APPLICATION OF LOCK TIGHT #14
   - CONFIRM CLEANING STATE #15
   - RECORD OF SPECIAL ITEMS #16

EXAMPLE OF CATEGORY CODE CONVERSION TABLE

| CHECK BOX No. | CHECK MARK | CATEGORY CODE |
|---|---|---|
| #1 | ✓<br>○<br>/<br>× | 01001<br>01002<br>01003<br>01004 |
| #2 | ✓<br>○<br>/<br>× | 02001<br>02002<br>02003<br>02004 |
| ⋮ | ⋮ | ⋮ |

HANDWRITTEN DATA STORE MEMORY

| CHECK BOX No. | CATEGORY CODE |
|---|---|
| #1 | 01001 |
| #2 | 01002 |
| #3 | 01003 |
| #4 | 01004 |
|  |  |

LIQUID CRYSTAL TABLET

○△✕ OPERATION REPORT

| NAME OF ENGINEER VISITED | | TIME AND DATE | |
|---|---|---|---|
| NAME OF CUSTOMER | | NAME OF PERSON ACKNOWLEGED | |
| ADDRESS | | | |

CONTENTS OF OPERATION

FIG.9

EXAMPLE OF CATEGORY CODE CONVERSION TABLE 12-11

| NAME OF FIELD | WORDS REGISTERED | CODE |
|---|---|---|
| NAME OF ENGINEERS VISITED | ASANO○○<br>IIZUKA○○<br>UEDA○○<br>⋮ | 01001<br>01002<br>01003<br>⋮ |
| NAME OF CUSTOMER | BANK○○<br>BANK△△<br>BANK××<br>⋮ | 02001<br>02002<br>02003<br>⋮ |
| ⋮ | ⋮ | ⋮ |

FIG.10

HANDWRITTEN DATA STORE MEMORY

| NAME OF FIELD | CATEGORY CODE |
|---|---|
| NAME OF ENGINEER VISITED | 01001 |
| NAME OF CUSTOMER | 02002 |
|  |  |

○△✕ OPERATION REPORT

| NAME OF ENGINEER VISITED | | TIME AND DATE | |
|---|---|---|---|
| NAME OF CUSTOMER | | NAME OF PERSON ACKNOWLEGED | |
| ADDRESS | | | |

| PRODUCT | | SERIAL NUMBER | |
|---|---|---|---|
| CONTENTS OF PHENOMENON | | | |
| CAUSE AND TREATMENT | | | |
| REMARKS | | | |

FIG.13

MODEL SENTENCE/CATEGORY CODE CONVERSION MEMORY

| MARK BOX | REGISTERED MODEL SENTENCE | CATEGORY CODE |
|---|---|---|
| CONTENTS OF PHENOMENON | PAPER JAM IN SHEET FEEDER | 01000 |
| CAUSE AND TREATMENT | | |

EXAMPLE OF CATEGORY CONVERSION TABLE

12-22

| MARK BOX | CODE TYPE | REGISTERED WORD | CODE |
|---|---|---|---|
| CONTENTS OF PHENOMENON (TROUBLE) | TROUBLE SITE CODE | PRINT HEAD<br>SHEET FEEDER<br>TONER<br>⋮ | 01001<br>01002<br>01003<br>⋮ |
| | TROUBLE CONTENT CODE | PAPER JAM<br>BLACK LINE<br>BLANK CHARACTER<br>⋮ | 02001<br>02002<br>02003<br>⋮ |
| CAUSE AND TREATMENT | CAUSE FOR TROUBLE CODE | WORN OFF<br>EXCESS CHARGE<br>ELECTROSTATIC NOISE<br>⋮ | 03001<br>03002<br>03003<br>⋮ |
| | TREATMENT CODE | REPLACE<br>ADJUST<br>CLEANING<br>⋮ | 04001<br>04002<br>04003<br>⋮ |
| ⋮ | | ⋮ | ⋮ |

FIG.15

HANDWRITTEN DATA STORE MEMORY

| MARK BOX | CATEGORY CODE |
|---|---|
| TROUBLE CONTENTS | 01002 02001 |
| CAUSE AND TREATMENT | 03002 04003 |
|  |  |

| AREA | AREA LOCATION DATA | ATTRIBUTE | POINT ALLOTTED |
|---|---|---|---|
| TEST NUMBER | ×××××× | NUMERAL | |
| STUDENT NUMBER | ×××××× | NUMERAL | |
| SCORE MARK BOX | ×××××× | NUMERAL | |
| SUBTOTAL BOX(1) | ×××××× | NUMERAL | |
| GRADE AREA(1) | ×××××× | SYMBOL | ○ : 15, × : 0 |
| SUBTOTAL BOX(2) | ×××××× | NUMERAL | |
| GRADE AREA(2) | ×××××× | SYMBOL | ○ : 10, × : 0 |
| | | | |

FIG.20

| TEST NUMBER | STUDENT NUMBER | SCORE FOR EACH QUESTION IN GRADE AREA(1) | SUBTOTAL OF GRADE AREA(1) | SCORE FOR EACH QUESTION IN GRADE AREA(2) | SUBTOTAL OF GRADE AREA(2) | GRADE TOTAL |
|---|---|---|---|---|---|---|
| 0001 | 1234 | | | | | |
| 0001 | 1235 | | | | | |
| 0001 | 1236 | | | | | |
| | | | | | | |

FIG.21

```
                                                    TOTAL
┌─────────────────────────────────────────────┐    ╱ SCORE
│ SENIOR SECOND TERM, FINAL EXAMINATION  TEST │   ╱  BOX
│ ┌─────┬──────┐                      NUMBER  │
│ │CLASS│ NAME │                              │
│ └─────┴──────┘                    STUDENT   │
│                                   NUMBER    │
│                                             │
│                              ┌─────┐        │
│           WORLD HISTORY      │ 57  │        │
│           ─────────────      │  PTS│        │
│                              └─────┘        │
│  Q1. SELECT THE MOST APPROPRIATE WORD(S) FOR   ┌────┐
│      THE BLANK IN EACH SENTENCE. (15PTS EACH)  │ 15 │
│  ┌──────────────────────────────────────┐     │ PTS│
│  │ (1). NAPOLEON'S EXPEDITION TO RUSSIA WAS (Ⓐ).│
│  │   a. SUCCESSFUL   b. UNSUCCESSFUL           │
│  │   c. A MINORINCIDENT (TRIFLE)  d. A MISTAKE OF JUDGEMENT │
│  │                                             │    SUBTOTAL
│  │ (2). THE NOBEL PRIZE FOR PHYSICS FOR THE YEAR OF 1957 │  BOX
│  │   WAS WON BY ( ✗ ).                         │
│  │   a. OPPENHEIMER  b. EINSTEIN  c. SCHWAITEUR  d. NEWTON│
│  └──────────────────────────────────────┘
│                                              ┌────┐
│  Q2. MARK THE YEAR OF THE FOLLOWING INCIDENTS.│ 20 │
│      (10PTS EACH)                             │ PTS│
│  ┌──────────────────────────────────────┐
│  │ (1). ALEXANDER'S ORIENT EXPEDITION.    YEAR ( ✗ ).│
│  │ (2). CONQUEST OF ENGLAND BY THE NORMANS. YEAR ( ⓧ ).│
│  │ (3). BREAK-OUT OF THE FIRST WORLD WAR.  YEAR ( ⓧ ).│
│  └──────────────────────────────────────┘
│                                              ┌────┐
│  Q3. COMMENT OF THE FOLLOWING TOPICS.         │ 23 │
│      (20PTS EACH)                             │ 22̶ │
│  ┌──────────────────────────────────────┐    │ PTS│
│  │ (1). LEADERSHIP OF CLEOPATRA                │
│  │  ─ ─ ─ ─ ─ ─ ─ ─ ─ ─                       │
│  │  ─ ─ ─ ─ ─ ─ ─ ─ ─ ─   -2                  │
│  │                                             │
│  │ (2). HITLER'S RACE PURIFICATION THEORY      │
│  │  ─ ─ ─ ─ ─ ─ ─ ─ ─ ─                       │
│  │  ─ ─ ─ ─ ─ ─ ─ ─ ─ ─   5                   │
│  └──────────────────────────────────────┘
└─────────────────────────────────────────────┘
```

FIG.22

HANDWRITTEN DATA INPUT DEVICE HAVING COORDINATE DETECTION TABLET

BACKGROUND OF THE INVENTION

The present invention relates to a handwritten data input device for inputting data by taking the data input via handwriting on a tablet, and a program recording medium for the device.

This application is based on Japanese Patent Application No.9-96355, filed Apr. 1, 1997 and Japanese Patent Application No.9-122792, filed Apr. 28, 1997, the content of which is incorporated herein by reference.

In the conventional data input device having a tablet, a document on which character fill-in boxes are printed is placed on the tablet, and data handwritten in the character fill-in boxes of the document are taken in as handwriting data input to the input region on the tablet, on the basis of a predetermined document format (form), so as to recognize a character. Or, data handwritten in the input region of the tablet are input as image data.

Meanwhile, in a data processing apparatus such as a personal computer, data to be handled are not character data. For example, the contents of the data base are accessed using a category code (numeral string data) such as a customer code, area code or operation code, or data are collected for each separate category code. However, in order to input such a category code from the tablet-equipped data input device, it is required to input the numeral string one by one character by handwriting. Therefore, the operation for inputting a category code becomes very complicated, and the handwriting input must be carried out by learning the category codes by heart or while checking a code table.

In the meantime, at schools, cram schools, examination preparing companies, and the like, answer sheets are marked or graded one by one, and the result of the grading is input to a personal computer (work station) through a keyboard, thus storing and managing the test result of each person. More specifically, the grades of subtotals are obtained by marking or grading each and every question, and the subtotals are summed up to obtain the total. After that, the subtotals and the total are checked several times for possible errors, and the subtotals and the total are input via the keyboard of the personal computer.

However, such an operation is very much laborious, and the results of the grading must be newly input to the personal computer via the keyboard, which is a laborious operation for the grader.

BRIEF SUMMARY OF THE INVENTION

Accordingly, it is an object of the present invention to convert a particular symbol such as check mark, a particular character string such as to indicate a customer name, or a particular word, into a category code corresponding to the particular symbol for each input region on a tablet by simply inputting them in input regions on the tablet, by handwriting.

A related object of the present invention is to recognize numerical values input by handwriting in the input regions and sum them up, by simply inputting the numerical values in the input regions of the tablet by handwriting.

According to the present invention, there is provided a handwritten data input device for inputting a symbol handwritten on a coordinate detection tablet, as handwritten data input in input regions defined on the tablet, the handwritten data input device comprising:

code memory means for storing a category code which indicates a meaning of a particular symbol, to correspond to the particular symbol, for each of the input regions on the tablet; and code conversion means for converting the symbol handwritten in each of the input regions on the tablet, into a corresponding category code, by searching contents of the code memory means, which correspond to the input region, on the basis of the symbol.

According to the present invention, there is provided another handwritten data input device having a coordinate detection tablet, comprising:

format data memory means for defining a handwriting mark box as an input region on a tablet, so as to correspond to a marking sheet on a handwriting marking box is formed, and defining an input region of a subject of summation to be identifiable;

character recognition means for recognizing characters by taking in data handwritten in a handwriting marking box of a marking sheet for each input region, as handwritten data input to the input regions, while placing the marking sheet on the tablet; and summation means for carrying out a summing-up operation on the basis of the result of the character recognition made in an input region defined as an input region subjected to the summing-up operation, while handwritten data in each of the input regions is recognized as character by the character recognition means.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 2A and 2B shows a specific example of a marking sheet used in the first embodiment;

FIG. 5 is a diagram showing the contents of a category code conversion table in the RAM shown in FIG. 4;

FIG. 6 is a diagram showing the contents of a handwritten data store memory in the RAM shown in FIG. 4;

FIG. 9 is a diagram showing a specific example of a marking sheet used in a second embodiment;

FIG. 10 is a diagram showing the contents of a category code conversion table in the second embodiment;

FIG. 11 is a diagram showing the contents of a handwritten data store memory in the second embodiment;

FIG. 13 is a diagram showing a specific example of a marking sheet used in a third embodiment;

FIG. 14 is a diagram showing the contents of a model sentence category code conversion table in the third embodiment;

FIG. 15 is a diagram showing the contents of a category code conversion table in the third embodiment;

FIG. 16 is a diagram showing the contents of a handwritten data store memory in the third embodiment;

FIG. 20 is a diagram showing the contents of a format file in FIG. 19;

FIG. 21 is a diagram showing the data contents of a grade file in FIG. 19;

FIG. 22 is a diagram showing a specific example of a test sheet, in which grading is carried out;

DETAILED DESCRIPTION OF THE INVENTION

A preferred embodiment of a handwritten data input device according to the present invention will now be described with reference to the accompanying drawings.

First Embodiment

The first embodiment will now be described with reference to FIGS. 1 to 7.

Figure 1:
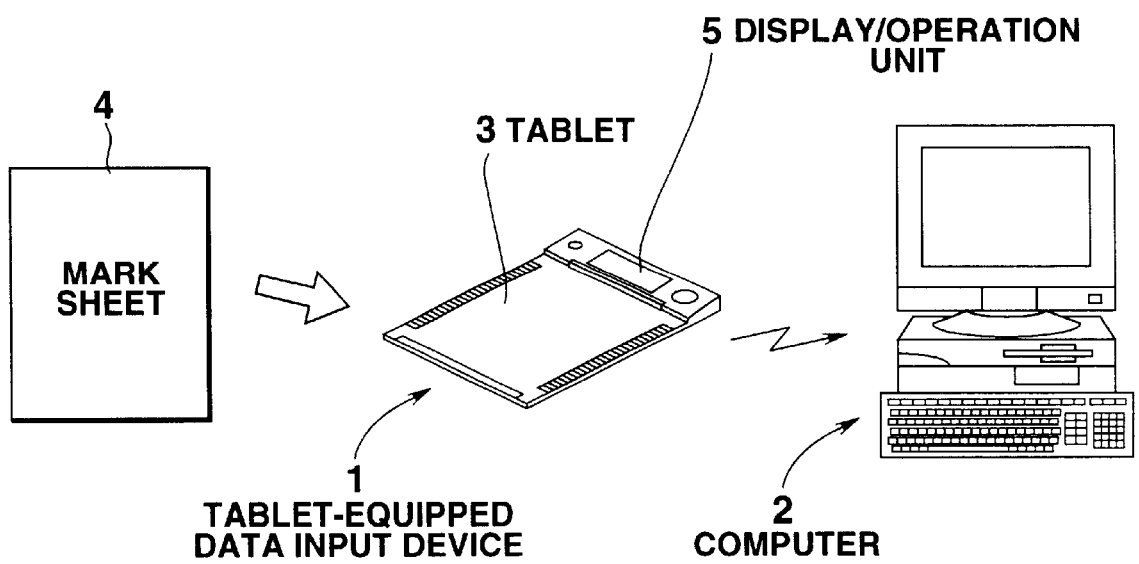
FIG. 1 is a diagram showing a first embodiment of a handwritten data input system according to the present invention.

FIG. 1 is a diagram showing the structure of the handwritten data input system. As shown, a data input device 1 having a tablet is connected to a host computer 2 via a communication link. A tablet 3 is provided on the upper surface of the tablet-equipped data input device 1. The tablet 3 is formed in a tabular shape, and is a pressure sensitive type coordinate input device, which inputs handwritten data by detecting a location coordinate of the data on the basis of the pressure of the pen applied through the marking sheet 4 while the marking sheet 4 is placed on the tablet 3. The marking sheet 4 is an operation inspection document as shown in FIG. 2B, and items of the inspection and check boxes (handwriting data filling boxes) in which one of predetermined check marks is filled, are printed to respectively correspond to each other. In this particular example, it is pre-designed that one of four kinds of marks is filled in a box in accordance with the contents of the inspection as can be seen in FIG. 2A, and they indicate "no abnormality found", "already adjusted or cleaned", "none of above" and "need repair".

While the marking sheet 4 such as an inspection document above is placed on the tablet 3, a predetermined check mark "○", "X", "/" or the like is marked for each of the items of the inspection of the marking sheet 4. Thus, the checked mark (image data) input from the tablet 3 is taken into the tablet-equipped data input device 1 for each of the input regions corresponding to the check boxes, in accordance with the model (sheet format) which defines the location of the check boxes of the marking sheet 4. Then, these marks are converted into predetermined category codes (numeral string data), and the results of the conversion are stored while associating them with the respective check boxes, and the contents stored are transmitted to the host computer 2 in accordance with a data transmission request or the like from the host computer 2. Further, in the tablet-equipped data input device 1, a touch screen (display/operation unit) 5 made by laminating transparent touch panels is provided on the display screen, and various types of messages and function names of touch keys and the like are dislayed on the display/operation unit 5. Various types of commands are input through a touch.

Figure 3:
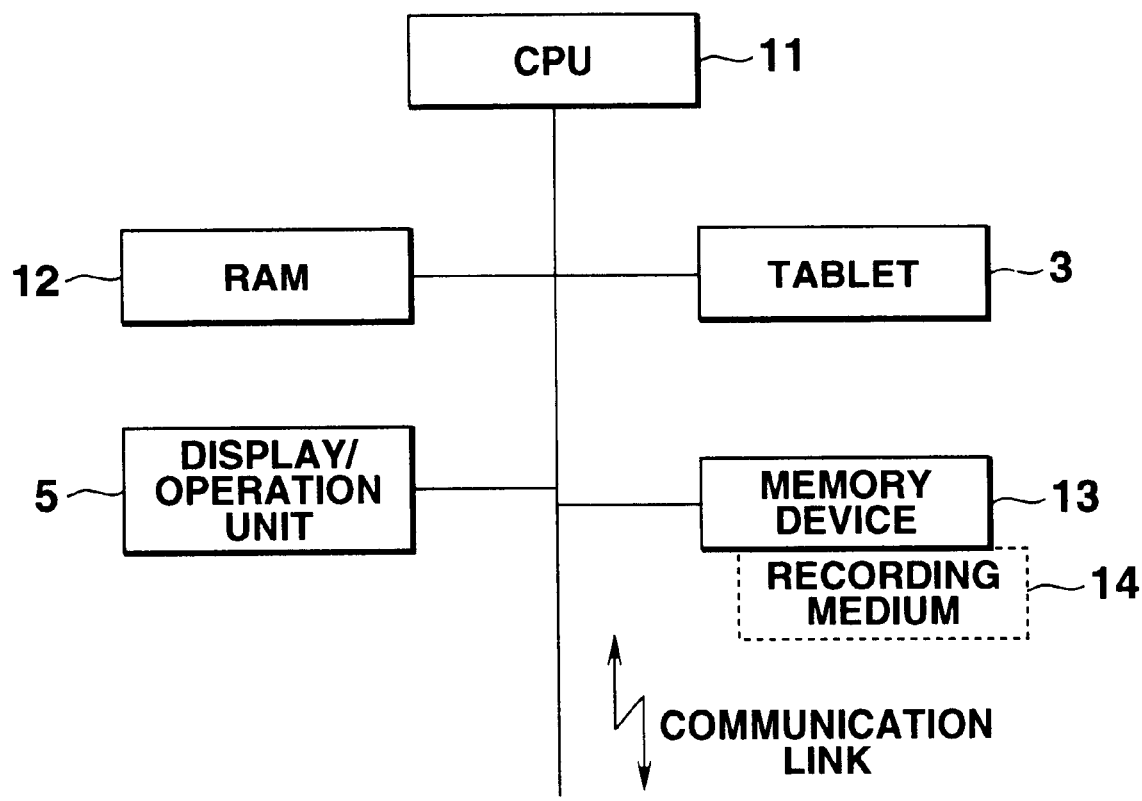
FIG. 3 is a block diagram showing the detailed structure of the handwritten data input device of the first embodiment.

FIG. 3 is a block diagram showing the entire structure of the tablet-equipped data input device 1.

A CPU 11 is a central operation processing device for controlling the entire operation of the data input device in accordance with various programs loaded in a RAM 12. A storage device 13 includes a storage medium 14 for pre-storing the operating system, various application programs, data files, character font data and the like, and a drive system therefor. The storage medium 14 may be fixedly provided, or detachably mounted, and the examples thereof are magnetic or optical storage medium, or semiconductor memory such as floppy disk, hard disk, optical disk or RAM card. The program or data in the storage medium 14 is loaded into the RAM 12 in accordance with necessary while controlled by the CPU 11. Further, the CPU 11 controls the storage of a program or data transmitted from other device, in the storage medium 14, or the use of a program or data stored in a storage medium provided in some other device, via a communication link or the like.

The tablet 3 and display/operation unit 5, which are peripheral devices for the input/output terminals, are connected to the CPU 11 via a bus line, and the CPU 11 controls the operation of these devices in accordance with the input/output program.

Figure 4:
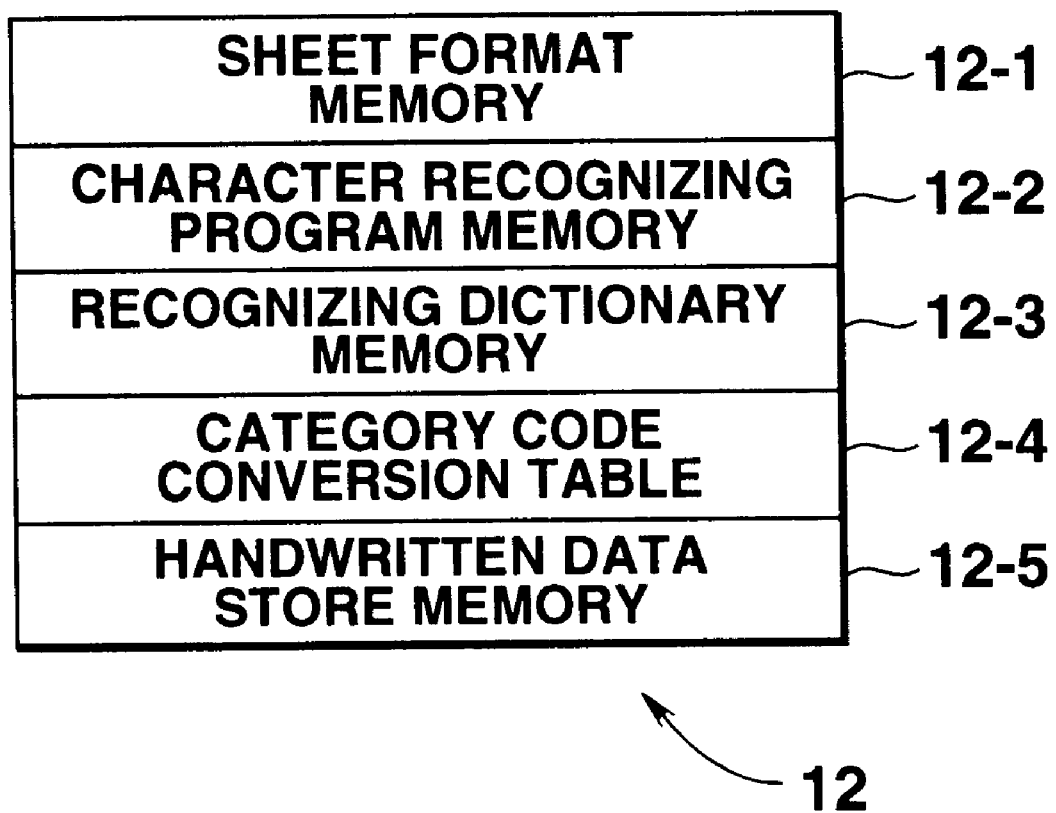
FIG. 4 is a diagram showing the contents of a RAM in FIG. 3.

FIG. 4 shows the contents of the RAM 12, and various regions are assigned to the RAM 12 in accordance with necessity. A sheet format memory 12-1 stores the sheet format while associating it with one of various types of marking sheets 4, and the sheet format defines the location of a check box of the marking sheet 4 as an input region of the tablet 3. The character recognition program memory 12-2 stores a program for recognizing handwritten data as a character. The recognition dictionary memory 12-3 is a dictionary memory for character recognition, referred to while recognizing a character. The category code conversion table 12-4 is fixedly stores the category code which indicates the meaning of a check mark while associating it with a particular mark for checking, for each input region of the tablet 3.

FIG. 5 shows the contents of the category code conversion table 12-4. In other words, for each of the box numbers for designating the check boxes of the marking sheet 4, a plurality of kinds (four kinds in this example) of check marks and category codes are stored. It should be noted that the check mark in the category code conversion table 12-4 may be of image data. However, in this case, the check mark is character data of a code type, and therefore the check mark input by handwriting it on the tablet 3 is subjected to an ordinary character recognition (symbol recognition) by the CPU 11 while referring to the recognition dictionary memory 12-3. On the basis of the result of the recognition (character data), the category code conversion table 12-4 is scanned, and the input data is converted to the corresponding category code. In this example, the category code is numeral string data having five digits, which defines the meanings of the check marks, "no abnormality found", "already adjusted or cleaned", "non of these" and "need repairs". Further, with regard to the category codes in the category code conversion table 12-4, even in the case where the same check mark is written, it is converted into the type of category code set in the category code conversion table 12-4 if it is written in a different check box on the marking sheet 4, since different category codes are stored for each of the check box numbers (for each of the input regions of the tablet 3). It should be noted that the contents of the category code conversion table 12-4 are arbitrarily set and registered by the user.

The handwritten data storing memory 12-5 is a memory for storing the result of conversion in which a check mark is converted into a category code, while associating the result with the check box. FIG. 6 shows the contents of the handwritten data storing memory 12-5. In other words, it is a memory for storing a category code converted from the check mark for each of the box numbers for designating the check boxes of the marking sheets 4. When the fill-in is finished for one sheet, the conversion results in the handwritten data storage memory 12-5 are transmitted to the host computer 2, and further it is possible to transmit the conversion results of a plurality of sheets to the host computer 2 as a package.

Next, the operation of the data input device will now be described with reference to the flowchart shown in FIG. 7. The program for realizing each of the functions described in the flowchart is stored in the storage medium 14 in the form of a program code which can be read by the CPU 11, and the contents of the program is loaded into the RAM 12. The same structure as the above can be found in other embodiments which will be later described.

Figure 7:
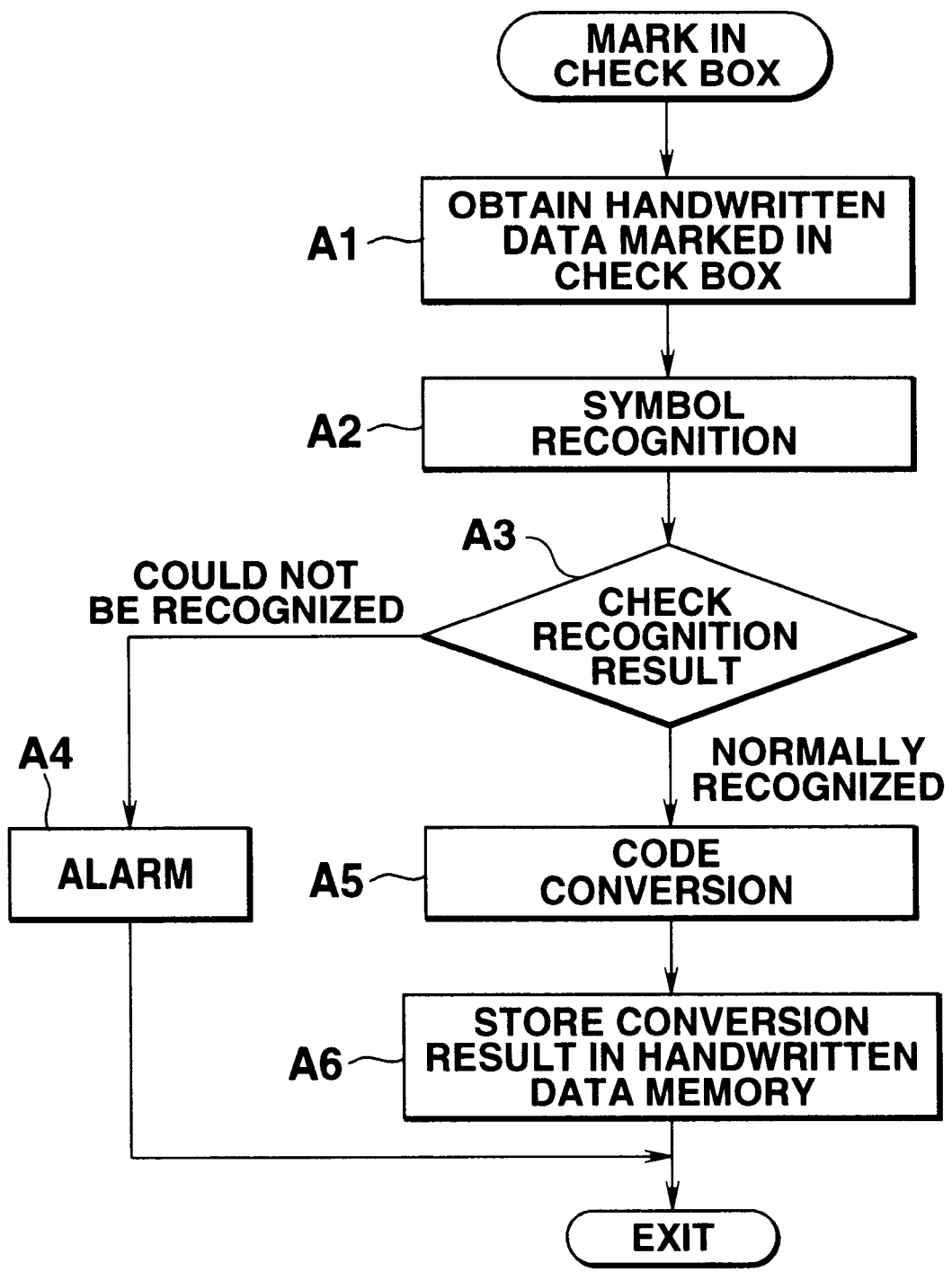
FIG. 7 is a flowchart illustrating the operation of the handwritten data input device of the first embodiment, which is started each time a mark is handwritten in a check box of a marking sheet.

FIG. 7 is a flowchart illustrating the operation which is started each time a predetermined mark is written in a check box of the marking sheet 4, and the operator is required to designate the type of the marking sheet 4 before the writing on the marking sheet 4 is started. When the type is designated, the CPU 11 read out the sheet format corresponding to the type from the sheet format memory 12-1, and set it in a stand-by state for marking. Then, the marking sheet 4 is placed on and aligned with the tablet 3, and the writing operation is started.

Then, the CPU 11 starts the character recognition program as follows. That is, a check mark handwritten in a check box of the marking sheet 4 is taken in as handwritten data input in an input region on the tablet 3 in accordance with the sheet format (Step A1), and the handwritten data is subjected to the character recognition (symbol recognition) as the data for one character, while referring to the recognition dictionary memory 12-3 (Step A2). Then, the result of the recognition is checked to judge if the data is not recognizable or normally recognized (Step A3). If the data is not recognizable, such a message is displayed on the message display as a warning (Step A4), whereas in the case where it is normally recognized, the operation proceeds to Step A5 for the category code conversion process. That is, the CPU 11 specifies the check box of the marking sheet 4, in which the data is marked, and the category code conversion table 12-4 is searched on the basis of the box number and the result of the recognition in the form of symbol (checked mark). Then, the category code corresponding to the check box number and the checked mark is read. Thus, the checked mark is converted into the corresponding category code. Further, the conversion result (category code) is stored in the handwritten data storing memory 12-5 while associating the result with the check box number (Step A6). The above-described operation is repetitively carried out each time a mark is written in a check box of the marking sheet 4.

As described above, in the first embodiment, category codes are stored in the category code conversion table 12-4 for each of the check boxes (each input region on the tablet 3) of the marking sheet 4 while associating the codes with the particular check marks. When a predetermined check mark is written in an input region of the tablet 3, which corresponds to a check box of the marking sheet 4, the checked mark is subjected to the symbol recognition on the basis of the check mark in the input region, and the category code conversion table 12-4 is searched on the basis of the results of the recognition, thus making possible to convert the written data into the corresponding category code. In other words, a mark can be converted into a category code corresponding to the check box only by writing the predetermined mark in a check boxy of the marking sheet 4. Therefore, it becomes unnecessary to input a category code directly, thus improving the operability. Further, even if check marks of the same type are written, they will be converted into different category codes for each check box. Therefore the number of types of check marks can be reduced, and the operability can be further improved. Further, the category codes thus converted are stored and managed in the handwritten data storing memory 12-5 while associating them with the check boxes. Therefore, as the host computer 2 takes in the contents of the handwritten data storing memory 12-5 directly as they are, via a communication link, for example, the contents of the data base can be updated as the written contents of one sheet.

The first embodiment was described in connection with the case where the marking sheet 4 is placed on the tablet 3 for making a mark; however if a transparent tablet is used, the sheet may be set underneath the tablet. Further, the tablet may be of an electromagnetic induction type.

Figure 8:
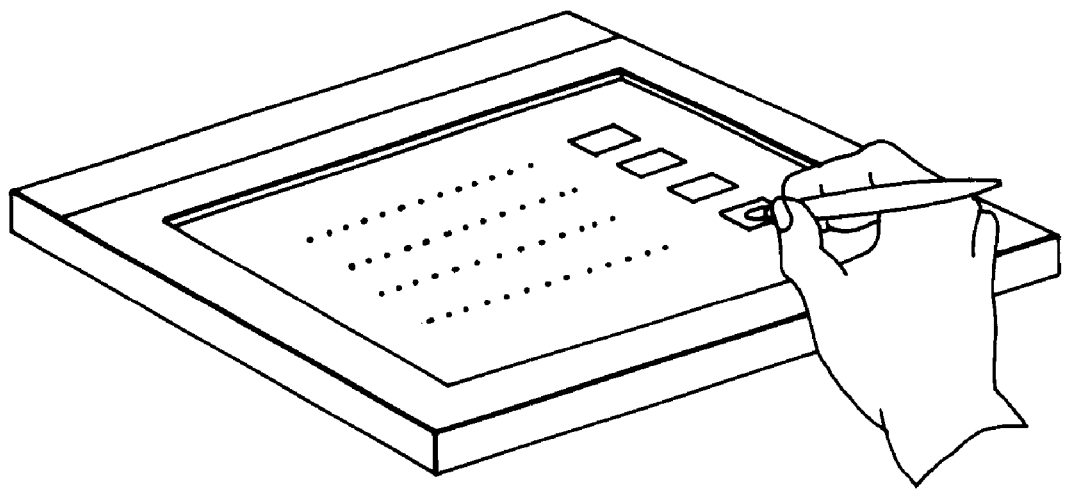
FIG. 8 is a diagram showing a liquid crystal type tablet which is a modification of the first embodiment.

Further, the present invention may not be limited to the type in which the tablet and a marking sheet are placed on one another, but it may be of a liquid crystal type tablet made by laminating a transparent touch panel on the screen of the liquid crystal display, as shown in FIG. 8. In such a modification, it suffices if the contents of the items (character string) are displayed on the liquid crystal display screen, together with check boxes, while associating them with the items.

Other embodiments of the handwritten data input device according to the present invention will be described. The same portions as those of the first embodiment will be indicated in the same reference numerals and their detailed description will be omitted.

Second Embodiment

The second embodiment will now be described with reference to FIGS. 9 to 12. A tablet-equipped data input device 1 according to the second embodiment, has basically a similar structure to that of the tablet-equipped data input device 1 shown in FIG. 3. Further, a sheet format memory 12-1, a character recognition program memory 12-2, and a recognition dictionary memory 12-3 have basically similar structures to those of the first embodiment shown in FIG. 4.

In the second embodiment, a specific character string such as the name of a customer or the name of area (states, county, city or the like) is input by handwriting to a marking sheet 4, and these handwritten data are converted into category codes such as customer code and area code. FIG. 9 illustrates a specific example of the marking sheet 4 used in the second embodiment, and in this operation report, character string marking boxes for filling, for example, the name of engineer visited, the name of customer and the address, are provided.

FIG. 10 illustrates a category code conversion table 12-11 in the second embodiment, and FIG. 11 illustrates a handwritten data storing memory 12-12. In the category code conversion table 12-11, words to be handwritten in the character string marking boxes of the marking sheet 4 are arbitrarily preset and pre-registered for each of the field names corresponding to the respective marking boxes, and category codes for identifying the words while associating them with the registered words (character string code) are set. The handwritten data storing memory 12-12 has a structure for storing a category code for each of the filed names.

Figure 12:
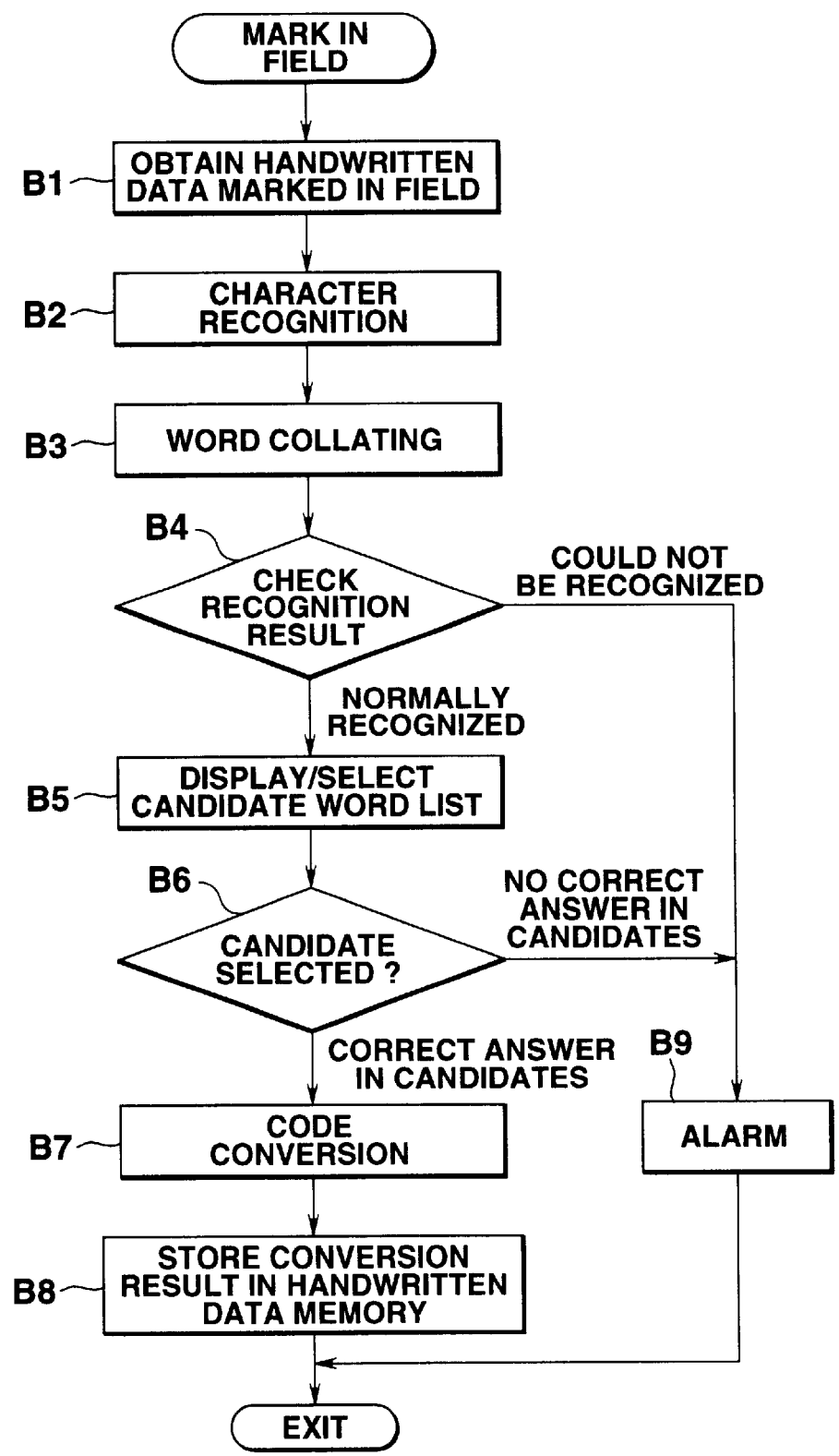
FIG. 12 is a flowchart illustrating the operation of the handwritten data input device of the second embodiment, which is started each time a character string is handwritten in a field of a marking sheet in the second embodiment.

FIG. 12 is a flowchart illustrating the operation of the second embodiment.

First, when a name, an address or the like is handwritten in character string marking boxes on the marking sheet 4, the data written the marking boxes are taken in as handwritten data input in the field of the tablet 3, which corresponds to the written data (Step B1), the handwritten data is subjected to the character recognition for each character (Step B2), and written data is collated with words registered in the category code conversion table 12-1 on the basis of the result of the recognition (Step B3). In this case, an algorithm capable of carrying out collation even if the character recognition rate is not 100%, is used. Such an algorithm is conventional, and therefore the explanation thereof will be omitted. Then, in the following Step B4, the result of the recognition at the character recognition process is checked if the written data is unrecognizable or normally recognized. If it is unrecognizable, the message of suggesting to rewrite is displayed, as a warning (Step B9). If it is normally recognized, registered words found by searching the contents of the category code conversion table 12-11 on the basis of the result of the recognition are displayed as candidates to be selected, so as to be able to select an arbitrary candidate from them (Step B5). In the following Step B6, it is determined whether or not a correct candidate has been selected. If a correct candidate is not included in the displayed candidates, the operation proceeds to Step 9, and the rewriting is requested, whereas if a correct candidate is included, a category code in the category code conversion table 12-11, which corresponds to the selected candidate (registered word) is read, which is called a code conversion process (Step B7). Then, the result of the conversion (category code) is stored in the handwritten data storing memory 12-12 while associating it with a field name (Step B8). The above-described operation is repeated each time a character string is written.

As described above, in the second embodiment, category codes are stored in the category code conversion table 12-11 while associating them with each of the character string marking boxes (fields) of the marking sheet 4. When a customer's name is handwritten in the marking sheet 4, the character recognition is carried out, and the contents of the category code conversion table 12-11 are searched on the basis of the result of the recognition, thus making it possible to convert handwritten data into a category code such as a corresponding customer's name code. Thus, it is not necessary to directly input a customer's name code or the like, thus improving the operability. Further, thus converted category code is associated with the corresponding area name, and stored and managed in the handwritten data storing memory 12-12. Thus, this embodiment also achieves the technique in which the host computer 2 can directly take in the contents of the handwritten data storing memory 12-12 via a communication link, as in the case of the first embodiment.

Third Embodiment

The third embodiment of the present invention will now be described with reference to FIGS. 13 to 17. A tablet-equipped data input device 1 according to the third embodiment, has basically a similar structure to that of the tablet-equipped data input device 1 shown in FIG. 3. Further, a sheet format memory 12-1, a character recognition program memory 12-2, and a recognition dictionary memory 12-3 have basically similar structures to those of the first embodiment shown in FIG. 4.

In the third embodiment, when a character string consisting of a plurality of words is written in the marking sheet 4, the character string is converted in the unit of each word, or the entire character string is converted into one category code. FIG. 13 shows a specific example of a marking sheet 4 used in the third embodiment, and this operation report has a character string marking boxes for "contents of phenomenon", "cause and treatment" and the like, and a series of sentences are written in the marking boxes.

FIG. 14 illustrates the contents of a model sentence category code conversion table 12-21, in which model sentences to be written in the marking boxes are arbitrarily preset and preregistered for each marking box, and category codes for identifying the sentences while associating them with the respective registered model sentences (character string codes). FIG. 15 illustrates a category code conversion table 12-22 in the third embodiment. FIG. 16 shows a handwritten data storing memory 12-23. The category code conversion table 12-22 stores code types, registered words and category codes for each marking box, and the handwritten data storing memory 12-23 stores category codes for each marking box.

Figure 17:
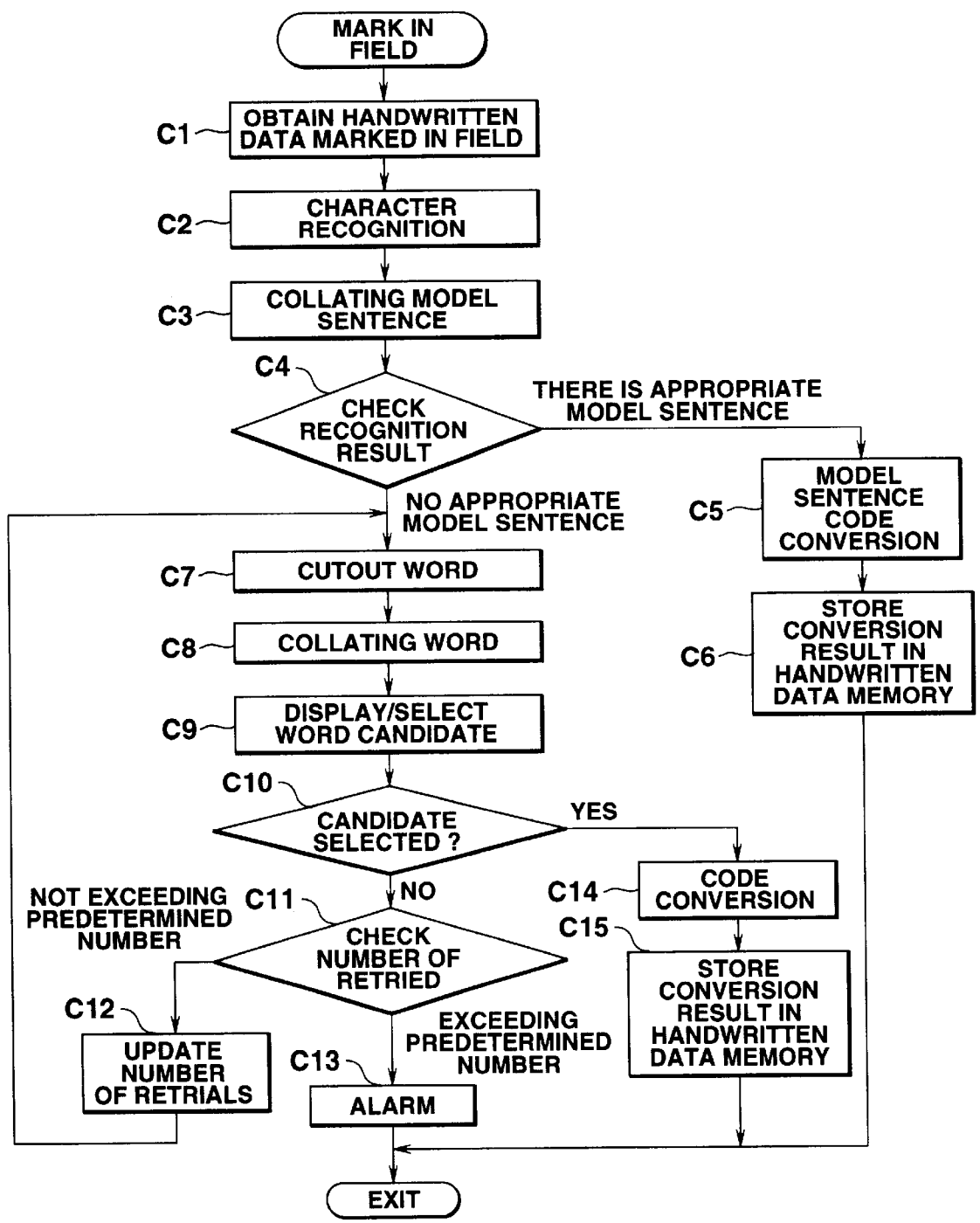
FIG. 17 is a flowchart illustrating the operation of the handwritten data input device of the third embodiment, which is started each time a sentence is handwritten in a marking box of a marking sheet.

FIG. 17 is a flowchart illustrating the operation of the third embodiment.

First, when a sentence is handwritten in character string marking boxes on the marking sheet 4, the data written in the marking boxes are taken in as handwritten data input in the area of the tablet 3 (Step C1), the handwritten data is subjected to the character recognition for each character (Step C2), and written data is collated with model sentences while searching them in a model sentence category code conversion table 12-21 on the basis of the result of the recognition (Step C3). Then, it is determined whether or not the written sentence is registered as a model sentence (Step C4). If it is registered, the category code corresponding to the input sentence is read from the model sentence category code conversion table 12-21, and then converted into a code (Step C5). Then, the result of the conversion is stored in the handwritten data storing memory 12-23 while associating it with a respective marking box (Step C6).

On the other hand, if the result of the collation with model sentences indicates that there is no matching model sentence, the operation proceeds to the Step C7, where the process for cutting out words from the handwritten sentence is carried out. In this process, words are cut out by detecting Japanese Katakana characters (in the case of Japanese), postpositions (in Japanese grammar), punctuations, and the like, and the contents of the category code conversion table 12-22 in the marking boxes are searched on the basis of thus cut out words, so as to collate them with the registered words (Step C8). In this case, an algorithm capable of carrying out collation even if the character recognition rate is not 100%, is used. The word collation is thus carried out, and candidates for the word are displayed as a list, where the selection of a candidate can be made (Step C9). Maintaining this state, it is determined whether or not a correct candidate is selected (Step C10). If a correct candidate is not selected, the predetermined number of retrials is checked (Step C11), and if the number of retrials is a preset number or less, the retrial number is updated in the Step C12, and then the operation returns to the Step C7, where words are cut out again for the word collation (Step C8). In this case, there is used such an algorithm which can perform collation even if the character recognition is performed at 100%. As a result of the word collation carried out as above, a list of candidates are displayed such that the selection of a candidate can be made (Step C9). While maintaining this state, it is determined whether or not a correct candidate is selected (Step C10). If a correct candidate is not selected, the predetermined number of retails is checked (Step C11), and if the number of retrials is a preset number or less, the retrial number is updated in the Step C12, and then the operation returns to the Step C7, where words are cut out again for the word collation (Step C8). If a correct candidate is not selected after such a process is executed for the predetermined number of retrials, a message indicating such contents is displayed as a warning (Step C13). When a correct candidate is selected, a process of converting a category code corresponding to the selected registered word, which is read out from the category code conversion table 12-22, is carried out (Step C14), and the result of the conversion is stored in the handwritten data storing memory 12-23 while associating it with the respective marking box (Step C15).

The above-described operation is repeated each time a sentence is handwritten in the marking boxes of the marking sheet. Therefore, when a sentence, for example, "paper jam occurred in sheet feeder" is written in the marking box for the item of "contents of phenomenon", the sentence is judged if it matches with a model sentence preset in the model sentence category code conversion table 12-21. If the written sentence does not match with a model sentence, words are cut out from the sentence, and they are converted into category codes in the unit of one word, while referring to the category code conversion table 12-22. In this particular case, the two words "sheet feeder" and "paper jam" are cut out, and they are converted into "01002" and "02001" as the category codes corresponding respectively to these words. Or, a model sentence "paper jam in sheet feeder" is marked, it is converted into the corresponding category code in the model sentence category code conversion table 12-21. Thus, even if a sentence is input by handwriting, it can be converted into the corresponding category code. Further, the converted category code is stored in the handwritten data storing memory 12-23 while associating the code with the respective marking box. With this structure, the host computer 2 can take in the contents of the handwritten data storing memory 12-23 via a communication link, in order to process them, as in the case of the first embodiment.

It should be noted that a marking sheet of the second and third embodiments may be set underneath the tablet, or the tablet of the second and third embodiments may be of an electromagnetic induction type, or of a liquid crystal display type in which a transparent touch panel is laminated on the liquid crystal display screen in the same manner as in the first embodiment.

Fourth Embodiment

The fourth embodiment of the present invention will now be described with reference to FIGS. 18 to 26.

Figure 18:
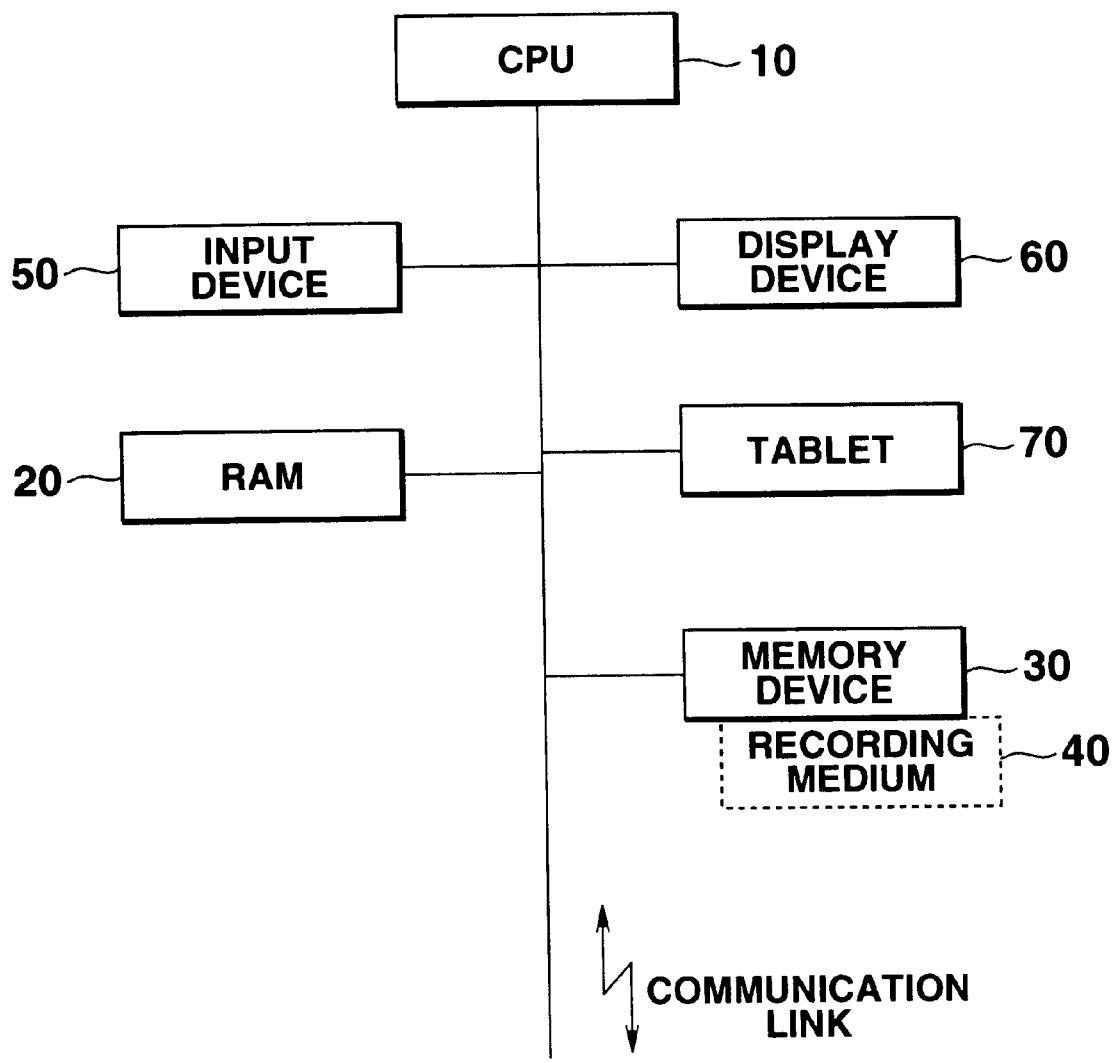
FIG. 18 is a block diagram showing the entire structure of a handwritten data input system of a fourth embodiment.

FIG. 18 is a block diagram showing the entire structure of the handwritten data input device of the fourth embodiment.

A CPU 10 is a central operation processing device for controlling the entire operation of the handwritten data input device in accordance with various programs loaded in a RAM 20. A storage device 30 includes a storage medium 40 for pre-storing the operating system, various application programs, data files, character font data and the like, and a drive system therefor. The storage medium 40 may be fixedly provided, or detachably mounted, and the examples thereof are magnetic or optical storage medium, or semiconductor memory such as floppy disk, hard disk, optical disk or RAM card. The program or data in the storage medium 40 is loaded into the RAM 20 in accordance with necessary while controlled by the CPU 10. Further, the CPU 10 controls the storage of a program or data transmitted via a communication link or the like from other device, in the storage medium 40, or the use of a program or data stored in a storage medium provided in some other device, via a communication link or the like.

An input device 50, a display unit 60, and a tablet 70, which are peripheral devices for the input/output terminals of the CPU, are connected to the CPU 10 each via a bus line, and the CPU 10 controls the operation of these devices in accordance with the input/output program.

The input device 50 is a keyboard for inputting character string data and the like, or various commands. The tablet 70 is formed to have a plate shape, and is a pressure sensitive type coordinate input device, which inputs handwritten data by detecting a location coordinate of the data on the basis of the pressure of the pen applied through a marking sheet, which will be later explained, while the marking sheet is placed on the tablet 70.

Figure 19:
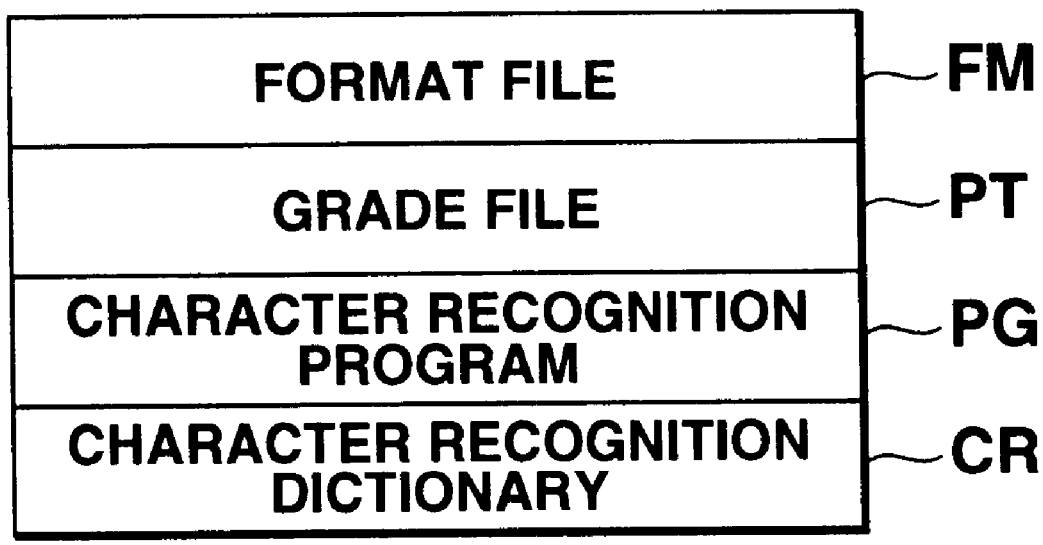
FIG. 19 is a diagram showing the contents of a memory device in FIG. 18.

FIG. 19 shows the contents of the storage device 30, and a format file FM, a grade file PT, a character recognition program PG, and a character recognition dictionary CR are stored in the storage device 30 such as to be loaded into the RAM 20 in accordance with necessity. The format file FM stores format data which defines handwriting marking boxes of a marking sheet as input regions of the tablet 70, while associating the data with the corresponding type of the marking sheet. The format data shown in FIG. 20 is a format corresponding to an examination sheet shown in FIG. 22. More specifically, the examination sheet contains "Test No.", "Student No.", and "Total Score Box", as handwriting marking boxes for the grader, as well as "Subtotal" and "Grading Area" which correspond to the respective question. The "area" and "area location coordinate" are defined in the format file FM as the format data in order to define each handwriting marking box as a respective input region of the tablet 70. In the format file FM, "test number", "student number", "score box", "subtotal box (1)", "grading area (1)", "subtotal (2)", "grading area (2)", . . . are stored as the "area", and further a two-point diagonal coordinates (upper left coordinate, lower right coordinate) for specifying a rectangular region, are stored as "area location coordinate". For each of the areas, "attribute" which indicates if an area is for inputting a handwritten numeral, or a handwritten symbol, is stored, and also "allotted point" is stored while it is associated with a respective grading area. In this case, if the attribute is a symbol, the allotted point is stored for each symbol.

The grade file PT stores the result of the grading for each student. More specifically, as shown in FIG. 21, the grade file PT stores, besides the "test number" "student number" for each student, "score for each question in grading area (1)", "subtotal for grading area (1)", "score for each question in grading area (2)", "subtotal for grading area (2)", . . . and "total score", and the contents of the file are transferred to the host computer to be stored and managed. In the host computer, the contents of the grade file PT are analyzed so as to obtain the average score for each question, and the average of the total score, thus, for example, calculating out the standard deviation for each student. Further, the result of such a process can be summarized in the form of a graph, to be printed out.

Next, the operation of the handwritten data input device of the fourth embodiment will now be described with reference to the flowcharts shown in FIGS. 23 to 26. The program for realizing each of the functions described in the flowchart is stored in the storage medium 40 in the form of a program code which can be read by the CPU 10, and the contents of the program are loaded into the RAM 22.

Figure 23:
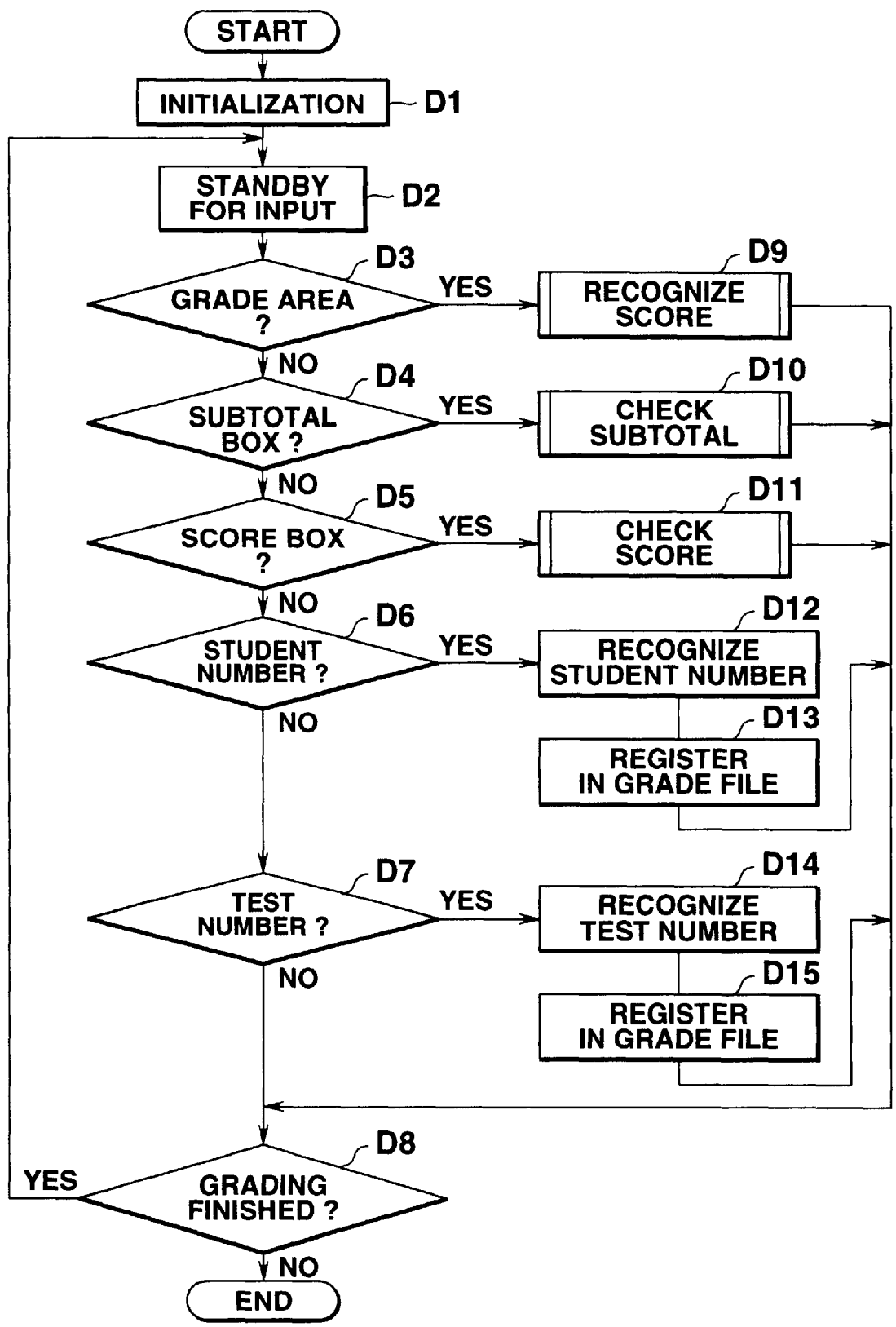
FIG. 23 is a flowchart showing the entire operation of the fourth embodiment while grading a test.

FIG. 23 is a flowchart illustrating the overall operation of grading examination sheets, which is started when the grading start key is operated. First, the initialization of each function is carried out (Step D1). More specifically, as the type of the examination sheet is designated as it is input, the format data corresponding to the type is read out from the format file FM to be downloaded on the RAM 20. In this case, when the format data is already downloaded, the designation of the type of the sheet is not required. Then, as an examination sheet is placed on the tablet 70 and a predetermined location (the point of origin) on the sheet is touched, the sheet and the tablet 70 are aligned with each other. After finishing the above-described initialization process, the device is set in a standby state for a handwriting input (Step D2). When a handwriting is input, it is checked which handwriting box, the handwriting is input (Steps D3 to D7).

When a handwriting is input to the "test No." of an examination sheet, such a fact is detected in Step D7, and the operation proceeds to the Step D14, where a character string is cut out for the input region corresponding to the handwriting marking box, and the character string (handwritten image) is subjected to the character recognition for each character. The result of the recognition (numeral string code) is registered and stored as a test number in a blank area in the grade file PT (Step D15). Or in the case where a handwriting is input to the "student No." of an examination sheet, such a fact is detected in Step D6, and the operation proceeds to the Step D12, where a character string is cut out and subjected to the character recognition. The result of the recognition (numeral string code) is registered and stored as a student number in the grade file PT (Step D13). After the test number and student number are handwritten as described above, the grading operation is started; however unless the instruction of the finishing the grading is detected by Step D8, the operation returns to the Step D2 to be stand-by for handwriting input.

When a handwriting is input in a grading area. (that is, YES in Step D3), the score recognition process is carried out in accordance with the flowchart shown in FIG. 24. That is, the data written in the grading area is cut out (Step E1). In this case, the cutout process is carried out for one character string on the basis of the spatial and time intervals between strokes. Then, the location of the writing is detected (Step E2). In other words, to which grading area, and to which location of the grading area, the writing is made, are detected, and the type of the grading area is detected on the basis of the detection result (Step E3). It should be noted here that in the format data, the attribute is defined for each region, and therefore the type of the grading area is judged by referring to the attribute. Then, if it is a grading area where a symbol such as "○", "X", . . . is to be written, the operation proceeds to the Step E10, where the character recognition process is carried out. In this case, the handwritten data obtained by cutting out characters, and the contents of the character recognition dictionary CR are collated with each other, and thus a symbol such as "○", "X", . . . is recognized. Then, the process for obtaining the score on the basis of the result of the recognition is carried out (Step E11). For example, when a recognized symbol is "○", an allotted point of "10" is obtained, and when it is "X", an allotted point of "0" is obtained, in accordance with the contents of the format file FM. However, as can be seen in FIG. 20, the same type of symbol may have a different allotted point, if it is written in a different grading area. The score thus obtained is registered and saved in the grade file PT as score data for the grading area, while associating the score data with the student (Step E9). Since the grading area as well as the location in the area, to which the writing is made, are already detected in the above-described Step E2, the score is judged as to which grading area and which question it corresponds to, on the contents of the detection, and the score is written in the grade file PT as the score data which corresponds to the area and the location of the area. This operation keeps on returning to the Step D2 until the finish of grading is detected in the Step DB in FIG. 23. Therefore, when the symbol written area is in the grading area (1), the above operation is repeated each time a symbol is handwritten in the grading for each question within the area, and the score for each question in the grading area (1) is obtained, to be registered and saved in the grade file PT.

Figure 24:
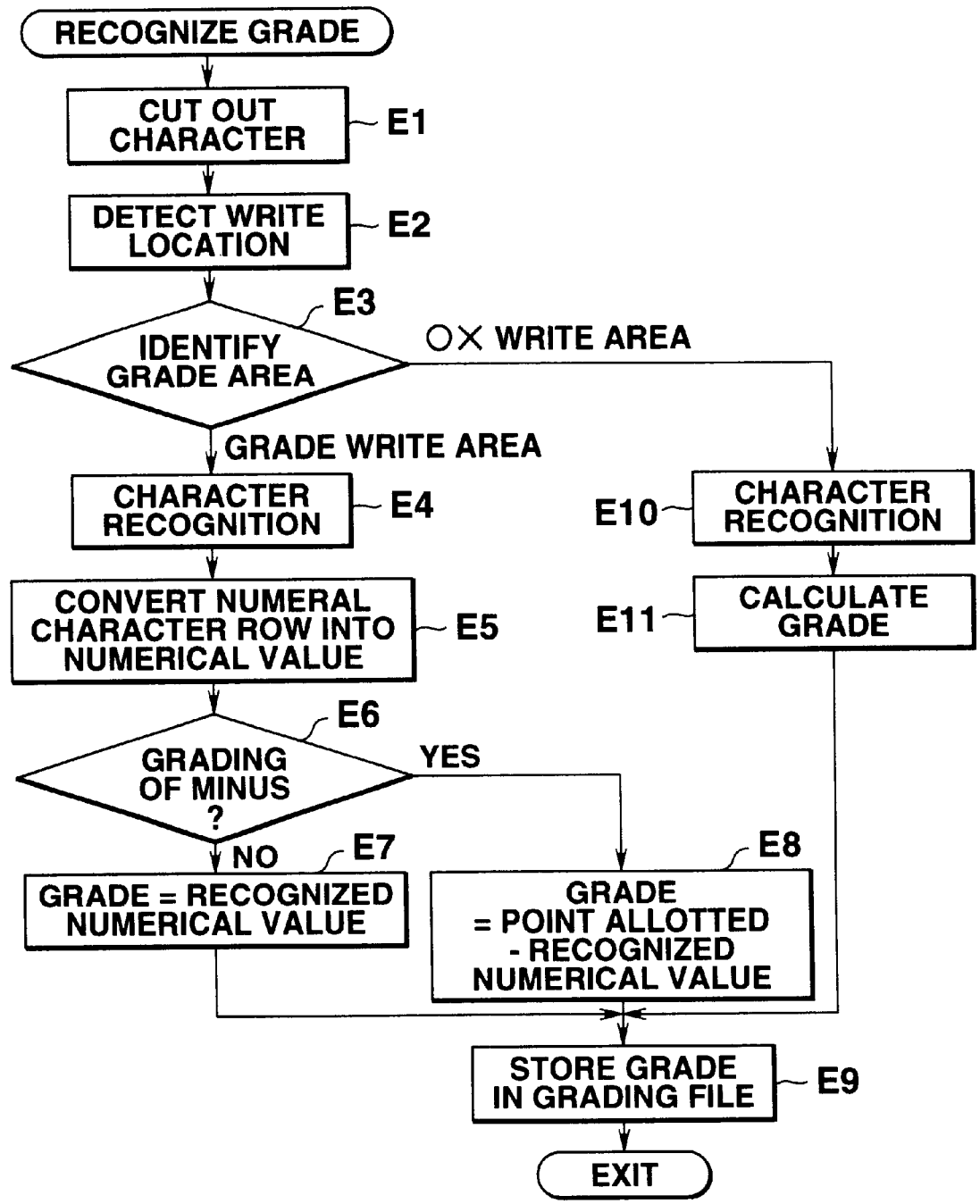
FIG. 24 is a flowchart illustrating step D9 (recognition of point) in FIG. 23 in detail.

In the case where the grading area is not a symbol writing area, but a score writing area, as a score is written in the area, it is detected that the writing is made in a score writing area in the Step E3 shown in FIG. 24. The operation proceeds to the Step E4, where the character recognition is carried out and the character string recognized as character is converted into a numerical value to obtain numerical data (score data) (Step E5). Further, it is determined whether or not the data is a negative score (Step E6). If it is a negative score, the allotted point set in the format file FM, for the grading area is read and the recognized value is subtracted from the allotted point so as to obtain the score for the question (Step E8), and register and save the score in the grade file PT (Step E9). By contrast, if it is a positive value, the recognized value is taken as the score for the question (Step E7), and then is registered and saved in the grade file PT (Step E9). Thus, supposing that, for example, of the grading areas shown in FIG. 22, the lower most score area is defined as the score writing area, and the point allotted to each question in the area is defined as "20 points each", when "−2" is marked as the score for the first question, a score of "18 points" is obtained, and registered in the grade file PT, and when "5" is marked as the second question, a score of "5 points" is obtained, and registered in the grade file PT.

Figure 25:
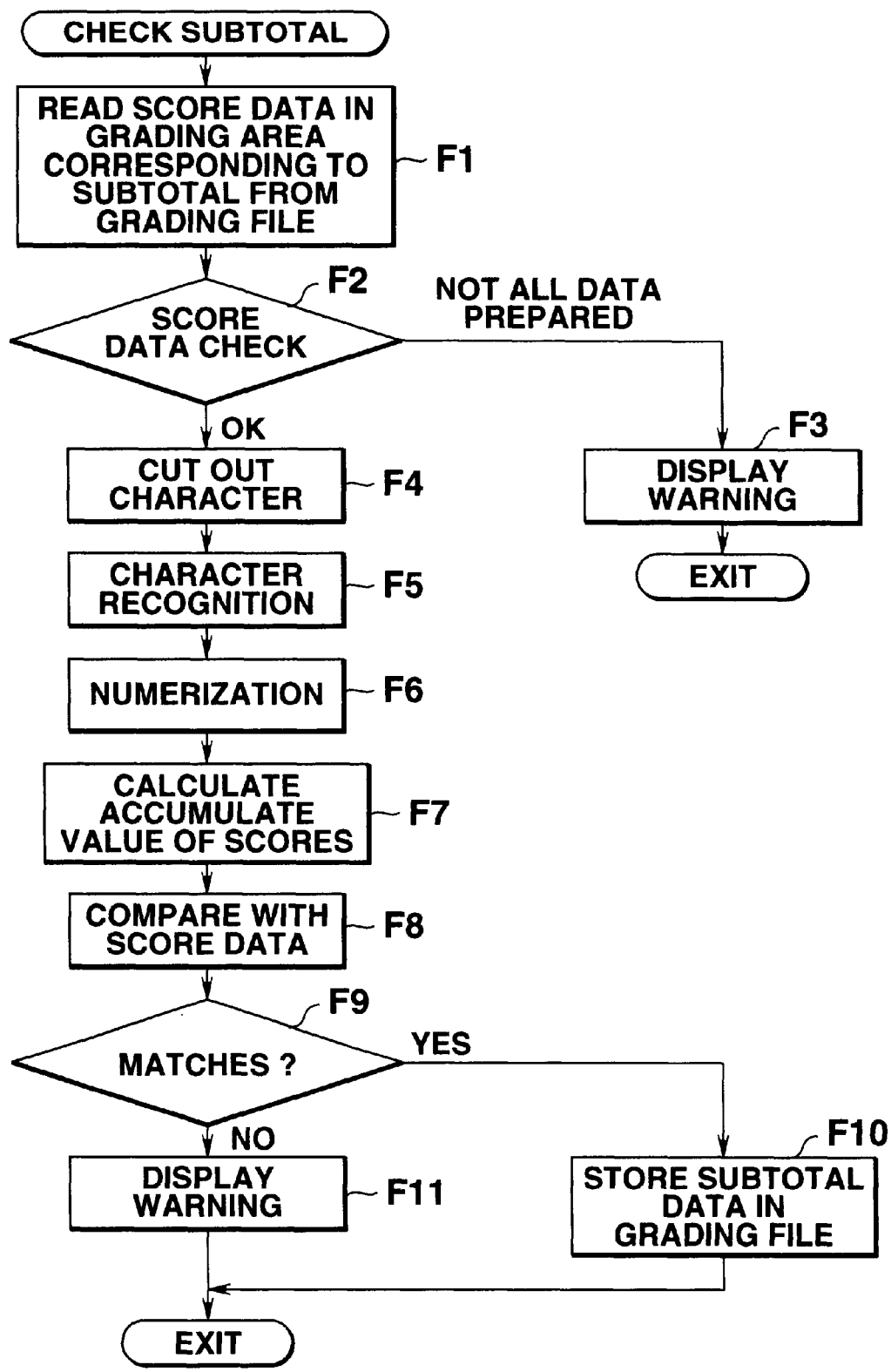
FIG. 25 is a flowchart illustrating step D10 (checking subtotals) in FIG. 23 in detail.

Further, in the case where a score is marked in the subtotal of the examination sheet, the marking is detected in the Step D4, and the operation proceeds to the Step D10, where the subtotal checking process is carried out. FIG. 25 is a flowchart illustrating the subtotal check process. In this process, each score in the grading area which corresponds to the subtotal box, is read out from the grade file PT (Step F1), and it is determined whether or not the grading for all the questions in the area is finished (that is, if all the score data are prepared) (Step F2). Then, if the grading for the area is not yet finished, such a message is displayed as a warning (Step F3), whereas if it is all finished, the character string written in the subtotal is cut out (Step F4), and the character recognition process is carried out (Step F5). In this case, the character string thus cut out is subjected to character recognition for each and every character, and the result of the recognition (numeral string) is digitized and converted into numeral data (subtotal. data) (Step F6). After that, these scores in the grading area which corresponds to the subtotal box are totaled, and the total value is compared with the subtotal data (Step F8). Then, if these values coincide with each other (that is, YES in Step F9), it is judged that the subtotal data written in the subtotal box is a correct value, and the subtotal data is associated with the grading area, and registered and saved in the grade file PT (Step F10). If it is detected that they do not coincide with each other, such a message is displayed as a warning (Step F11). Thus, in the case of the lower most grading area, where the score for the first question is "18 points", the score for the second question is "5 points", and thus the subtotal within the area is "23 points", but "22 points" is marked in the subtotal, a message indicating that they do not coincide is displayed as a warning. In this case, if a predetermined canceling symbol (two parallel lines) is marked in the subtotal box, an imaginary character input region is formed just outside the box. Further, when a new subtotal is marked in the imaginary input region, the marking error of the subtotal box can be corrected.

Figure 26:
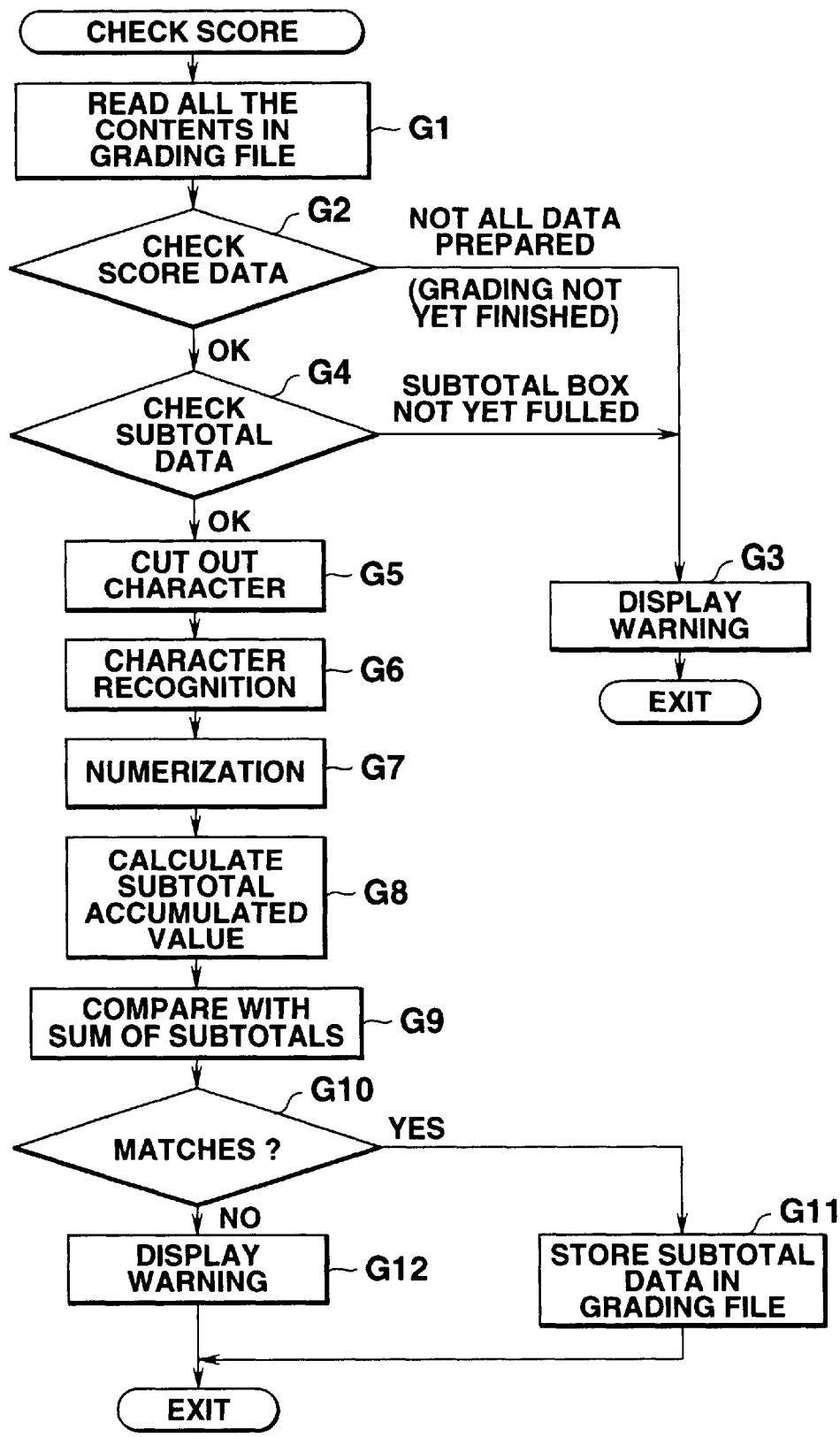
FIG. 26 is a flowchart illustrating step D11 (checking score) in FIG. 23 in detail.

When the marking in all the grading areas and subtotal boxes is finished as described above, and the score is marked in the total box, it is detected in the Step D5 of FIG. 23, and the operation proceeds to the Step D11, where the score checking process is carried out. FIG. 26 is a flowchart which illustrates the score checking process.

In this process, first, all the contents in the grade file PT are read out (Step G1), and it is determined whether or not all the grading is finished on the basis of the score data corresponding to each grading area (Step G2). Then, if it is not yet finished, such a message is displayed as a warning (Step G3). Further, even in the case where the grading is all the grading areas is finished, if the score data is not marked in all the subtotal boxes, it is determined in the Step G4, and such a message is displayed as a warning (Step G3). Further, in the case where the total score is marked at the stage where the marking for all the grading areas and subtotals is finished, characters are cut out on the basis of the input region corresponding to the total box (Step G5), and the character recognition process is carried out (Step G6). Then, the result of the recognition (numeral string) is digitized and converted into numeral data (subtotal data) (Step G6). After that, these scores in the grading area which corresponds to the subtotal box are totaled (Step G8), and the total value is compared with the subtotal data (Step G9). Then, if these values coincide with each other (that is, YES in Step G10), it is determined that the subtotal data written in the subtotal box is a correct value, and the subtotal data is registered and saved in the grade file PT (Step G11). If it is determined that they do not coincide with each other, such a message is displayed as a warning (Step G12). In this case also, if a predetermined canceling symbol (two parallel lines) is marked in the subtotal box, an imaginary character input region is formed just outside the box. Further, when a new subtotal is marked in the imaginary input region, the marking error of the subtotal box can be corrected.

As described above, in the handwriting data input device of the third embodiment, when an examination sheet is placed on the tablet 70, and the grading is carried out for each of the grading areas, the scores for these grading areas can be obtained for each area at the same time as they are marked. Further, when the score is marked in the subtotal corresponding to each of the grading areas, a subtotal value for the scores of the corresponding grading area is obtained. Then, the subtotal value and the score marked in the subtotal box are compared with each other, and it they do not coincide, a warning message is displayed. Thus, whether or not the score marked in the subtotal box is correct can be confirmed at the same time as the marking. Further, when the score is marked in the total score box after the score is marked in each of the subtotal boxes, a total value for the subtotals is obtained. Then, the total value and the score marked in the total box are compared with each other, and if they do not coincide, a warning message is displayed. Thus, whether or not the score marked in the total score box is correct can be confirmed at the same time as the marking. Furthermore, in the grade file PT, the score data for each of the questions in each grading area is stored in addition to the student number, and also the subtotals and total score are stored. Therefore, when the grade file PT is transmitted to the host computer, a personal grade report, a standard deviation table, a grade ranking for class, a grade ranking for school year and the like can be formed in the host computer on the basis of the grade file PT.

It should be noted that, in the fourth embodiment, when a score is marked in a subtotal box for each grading area, the grade is supposed to obtain the subtotal by mental calculation or the like, and mark it in the subtotal box; however when the total value which is the sum of values for the questions in an grading area, is displayed as a guide of the subtotal data, it is not necessary to obtain a subtotal by mental calculation or the like, thus making it possible to carry out the grading work at high efficiency. This is also the case for the total score, and it suffices if the total value of the subtotals is obtained as the total score for a particular student, and displayed as a guide.

Further, not only the case of grading examination sheets, the present invention can be applied to the case where symbols such as "○" and "X" are marked on, for example, survey sheets, and at the same time, the results are totaled for each symbol.

Furthermore, it should be noted that the fourth embodiment is described in connection with the case where a marking sheet is placed on a tablet 70, but with use of a transparent tablet, a marking sheet may be set underneath the tablet, or the tablet may be of an electromagnetic induction type as in the first to third embodiments.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data input apparatus comprising:
   a tablet which holds an input sheet having input areas printed thereon, detects positional coordinates of a handwritten item that is handwritten in one of the input areas, and outputs a detection signal in correspondence with detected coordinates;
   a format memory which stores format information of the input sheet including positions of the input areas, for each type of input sheet;

a code memory which stores handwritten items to be handwritten in each of the input areas and a category code that corresponds to each of the handwritten items, for each of the input areas of the input sheet;

a recognition unit which recognizes, when the input sheet is placed on the tablet, a handwritten item input in one of the input areas on the basis of the detection signal output from the tablet; and a converter which identifies an input area in which the handwritten item is input, on the basis of the detection signal output from the tablet and the format information stored in the format memory, reads a category code that corresponds to the identified input area and the handwritten item recognized by the recognition unit, from the code memory, and converts the handwritten item to a corresponding category code.

2. The data input apparatus according to claim 1, wherein the code memory stores different category codes assigned to the same handwritten item for different input areas of the input sheet.

3. The data input apparatus according to claim 1, wherein the code memory stores marks to be handwritten in the input areas and the category code that corresponds to each of the marks for each of the input areas of the input sheet.

4. The data input apparatus according to claim 1, wherein the code memory stores sentences to be handwritten in the input areas and the category code that corresponds to each of the sentences, for each of the input areas of the input sheet.

5. The data input apparatus according to claim 1, wherein the code memory stores words to be used into the input areas and the category code that corresponds to each of the words, for each of the input areas of the input sheet.

6. The data input apparatus according to claim 1, further comprising a category code memory which stores the category code converted from the handwritten item by the converter, in correspondence with the input area in which the handwritten item is input.

7. The data input apparatus according to claim 6, which is connected to a host computer via a communication line and thereby transmits the category code converted and stored in the category code memory in correspondence with the input area.

8. An article of manufacture comprising a computer usable medium having computer readable program code means embodied therein, the computer readable program code means comprising:

computer readable program code means for causing a computer to store, in a format memory, format information of an input sheet including positions of an input area, for each type of input sheet, the input sheet to be held on a tablet which detects positional coordinates of a handwritten item that is handwritten in one of the input areas, and outputs a detection signal in correspondence with detected coordinates;

computer readable program, code means for causing a computer to store, in a code memory, handwritten items to be handwritten in each of the input areas and a category code that corresponds to each of the handwritten items, for each of the input areas of the input sheet;

computer readable program code means for causing a computer to recognize, when the input sheet is placed on the tablet, a handwritten item input in one of the input areas on the basis of the detection signal output from the tablet; and computer readable program code means for causing a computer to identify an input area in which the handwritten item is input, on the basis of the detection signal output from the tablet and the format information stored in the format memory, read a category code that corresponds to the identified input area and the handwritten item recognized by the recognition unit, from the code memory, and convert the handwritten item to a corresponding category code.

9. A data input apparatus comprising:

a tablet which holds an input sheet having input areas printed thereon, detects positional coordinates of a handwritten item that is handwritten in one of the input areas and outputs a detection signal in correspondence with detected coordinates, the input areas including a grading area;

a format memory which stores format information including positions of the input areas, for each type of input sheet;

a recognition unit which recognizes, when the input sheet is placed on the tablet, a handwritten item input in one of the input areas on the basis of the detection signal output from the tablet; and a totaling unit which carries out a totaling process on the recognized handwritten item when the recognition unit recognizes the handwritten item input in the grading area.

10. The data input apparatus according to claim 9, wherein, when the recognition unit recognizes the handwritten item input in the grading area as a specific mark, the totaling unit carries out the totaling process and obtains an accumulation score on the basis of score data that is predetermined in correspondence with the specific mark.

11. The data input apparatus according to claim 9, wherein:

the input area includes a total area;

the format memory stores format information including a position of the total area, wherein the data input apparatus further comprises:

a warning unit which compares a total score obtained by the totaling unit and the recognition result of the total area and issues a warning when the total score obtained by the totaling unit and the recognition result of the total area do not coincide.

12. The data input apparatus according to claim 9, wherein:

the input area includes grading areas, a total score area, and subtotal areas, the subtotal area being an area for inputting a total score of the grading areas, the total area being an area for inputting a total score of the subtotal areas;

the format memory stores format information including positions of the grading areas, total score area, and subtotal areas;

the totaling unit carries out the totaling process to obtain a total score from recognition results of the subtotal areas, and wherein the data input apparatus further comprises a warning unit which compares the total score obtained by the totaling unit and a recognition result of the total area and issues a warning when the total score obtained by the totaling unit and the recognition result of the total area do not coincide.

* * * * *